United States Patent Office 3,197,486
Patented July 27, 1965

3,197,486
PROPYNYL DERIVATIVES OF ALPHA AND BETA CONIDENDROL
George B. Sterling, Mogadore, Ohio, assignor to The Dow Chemical Company, Midland, Mich., a corporation of Delaware
No Drawing. Filed Oct. 21, 1964, Ser. No. 405,608
2 Claims. (Cl. 260—343.3)

This is a continuation-in-part of my co-pending application Serial No. 333,639, filed December 26, 1963, now abandoned.

The novel compounds of the present invention are the propynyl derivatives of alpha and beta conidendrol and correspond to the formula

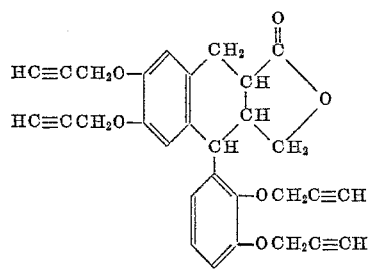

Alpha and beta conidendrol are diastereoisomers with the isomerism occuring at the carbon atom adjacent to the carbonyl group of the lactone ring, marked with an asterisk in the formula. The derivative compounds of the present invention are liquids which are somewhat soluble in many organic solvents and of low solubility in water. The compounds have been found to be useful as the toxic constituent in pesticidal compositions for the control of fish, insect, mollusk, plant, bacterial and fungal organisms such as flies, snails, minnows, mites, wild oats and corn.

The compounds can be prepared by reacting a propargyl halide with alpha or beta conidendrol. The reaction is carried out in the presence of a basic material and preferably in an organic liquid as reaction medium, such as acetone, methyl ethyl ketone, diethyl ketone, acetone-benzene and isopropanol. The reaction takes place smoothly at a temperature at which halide of reaction is produced and preferably at temperatures from about 0 to 100° C. The halide of reaction appears in the reaction mixture as the halide salt of the metal cation from the employed base. Representative basic materials include sodium and potassium carbonate. Good results are obtained when employing one molecular proportion of alpha or beta conidendrol and greater than one molecular proportion, as preferably an excess, of each of the propargyl halide and the basic material. The reaction consumes the reactants in the proportion of one mole of alpha or beta conidendrol and four moles each of the propargyl halide and the basic material. For optimum yields, the use of reactants in amounts which represent such proportions, is preferred.

In carrying out the reaction, the propargyl halide such as the chloride or bromide, the alpha or beta conidendrol and the basic material can be combined in any convenient fashion. However, in a preferred procedure the reactants are dispersed in an organic liquid as reaction medium. The mixture is then maintained at the reaction temperature until there is a substantial cessation in the formation of the halide of reaction, which indicates that the reaction is nearing completion. The halide of reaction can be removed by conventional procedures such as filtering the hot reaction mixture or diluting the reaction mixture with water and separating the product containing organic layer from the halide containing aqueous layer. The filtrate or the organic layer obtained during the dilution procedure can be used in pesticidal compositions or further purified by heating to remove the low boiling constituents and obtain the desired product as a residue.

*Example 1.*—4 - (3',4' - bis(2 - propynyloxy)phenyl)-1,2, 3,4 - tetrahydro - 3-(hydroxymethyl)-6,7-bis-(2-propynyloxy)-2-naphthoic acid γ-lactone (β-isomer)

Beta conidendrol (82 grams), propargyl bromide (130 grams) and potassium carbonate (140 grams) were dispersed in a mixture of 100 milliliters of acetone and 100 milliliters of benzene. The resulting dispersion was heated with stirring at the boiling temperature and under reflux for twenty-four hours. Following the heating period, the reaction mixture was diluted with water and the organic layer which separated during the washing procedure was collected by decantation. This organic layer was heated to remove the low boiling constituents and obtain the product as a liquid residue having a refractive index n/D of 1.5742 at 25° C. Nuclear magnetic resonance established that this product is the β-isomer of 4-(3',4'-bis(2-propynyloxy)phenyl) - 1,2,3,4 - tetrahydro - 3-(hydroxymethyl)-6,7-bis-(2-propynyloxy)-2-naphthoic acid γ-lactone.

*Example 2.*—4 - (3',4' - bis(2-propynyloxy)phenyl)-1,2, 3,4 - tetrahydro - 3-(hydroxymethyl)-6,7-bis-(2-propynyloxy)-2-naphthoic acid γ-lactone (α-isomer)

Alpha conidendrol, porpargyl bromide and potassium carbonate were allowed to react in quantities and procedures identical to those set forth in Example 1 to obtain the product as a liquid residue having a refractive index n/D of 1.5830 at 25° C. Nuclear magnetic resonance established that this product is predominantly the α-isomer of 4 - (3',4'-bis(2-propynyloxy)phenyl)-1,2,3,4-tetrahydro - 3 - (hydroxymethyl)-6,7-bis-(2-propynyloxy)-2-naphthoic acid γ-lactone.

The new compounds of the present invention are useful as herbicides and parasiticides for the control of a number of plant and parasite species. For such uses the unmodified compounds can be used. The products can also be dispersed on a finely divided solid and employed as a dust. Such mixtures can be dispersed in water with or without the aid of a surface active dispersing agent and the resulting aqueous suspensions employed as sprays, drenches or washes. In other procedures, the products of this invention can be employed as the toxic constitutent in solvent solutions, oil-in-water or water-in-oil emulsions or aqueous dispersions. In representative operations, substantially complete kills of northern fat-headed minnows are obtained when either of the two compounds of this invention are present in the minnows environment at concentrations of 5 parts per million by weight.

I claim:
1. 4 - (3',4' - bis(2 - propynyloxy)phenyl) - 1,2,3,4-tetrahydro - 3 - (hydroxymethyl) - 6,7 - bis-(2-propynyloxy)-2-naphthoic acid γ-lactone (β-isomer).
2. 4 - (3',4' - bis(2-propynyloxy)phenyl)-1,2,3,4-tetrahydro - 3 - (hydroxymethyl) - 6,7 - bis-(2-propynyloxy)-2-naphthoic acid γ-lactone (α-isomer).

No references cited.

WALTER A. MODANCE, *Primary Examiner.*